United States Patent
Colja et al.

(10) Patent No.: US 8,454,090 B2
(45) Date of Patent: Jun. 4, 2013

(54) PELVIC AND LUMBAR SUPPORT SYSTEM

(75) Inventors: Renato Colja, Windsor (CA); Robert J. McMillen, Tecumseh (CA); Dannion Smith, Kitchener (CA); Jeremie Gobbo, Windsor (CA)

(73) Assignee: Leggett & Platt Canada Co., Halifax, Nova Scotia (CA)

( * ) Notice: Subject to any disclaimer, the term of this patent is extended or adjusted under 35 U.S.C. 154(b) by 617 days.

(21) Appl. No.: 12/559,038

(22) Filed: Sep. 14, 2009

(65) Prior Publication Data

US 2011/0062757 A1 Mar. 17, 2011

(51) Int. Cl.
*B60N 2/66* (2006.01)
(52) U.S. Cl.
USPC .......... 297/284.4; 297/284.7; 297/284.1
(58) Field of Classification Search
USPC .............. 297/284.4, 284.1, 284.6, 284.7
See application file for complete search history.

(56) References Cited

U.S. PATENT DOCUMENTS

| | | | |
|---|---|---|---|
| 4,182,533 A | 1/1980 | Arndt et al. | |
| 4,295,681 A | 10/1981 | Gregory | |
| 4,465,317 A | 8/1984 | Schwarz | |
| 4,886,316 A | 12/1989 | Suzuyama et al. | |
| 5,567,010 A | 10/1996 | Sparks | |
| 5,823,620 A * | 10/1998 | Le Caz | 297/284.4 |
| 6,074,006 A * | 6/2000 | Milosic et al. | 297/284.6 |
| 6,125,851 A | 10/2000 | Walker et al. | |
| 6,631,951 B2 | 10/2003 | Blendea et al. | |
| 6,676,214 B2 | 1/2004 | McMillen et al. | |
| 6,905,170 B2 | 6/2005 | McMillen et al. | |
| 6,908,152 B2 | 6/2005 | McMillen | |
| 6,955,399 B2 | 10/2005 | Hong | |
| 7,125,077 B2 * | 10/2006 | Frank | 297/284.9 |
| 7,152,920 B2 * | 12/2006 | Sugiyama et al. | 297/284.6 |
| 7,252,335 B2 | 8/2007 | Samain et al. | |
| 7,290,837 B2 | 11/2007 | Sugiyama et al. | |
| 7,429,080 B2 | 9/2008 | Walker et al. | |
| 2006/0103204 A1 * | 5/2006 | Walker et al. | 297/284.4 |
| 2007/0262621 A1 | 11/2007 | Dong et al. | |

FOREIGN PATENT DOCUMENTS

CA 2521200 10/2004

OTHER PUBLICATIONS

International Search Report and Written Opinion for PCT/CA2010/001423, dated Dec. 7, 2010, 8 pages.

* cited by examiner

*Primary Examiner* — David Dunn
*Assistant Examiner* — Erika Garrett
(74) *Attorney, Agent, or Firm* — Michael Best & Friedrich LLP

(57) ABSTRACT

A pelvic support apparatus for a seat having a seat back and a seat pan includes a frame positioned within the seat back and a pelvic support member coupled with the frame adjacent a bottom of the seat back and a rear of the seat pan. The pelvic support member is movable between a first, retracted position, and a second, extended position that provides support to a pelvic area of a person seated in the seat. The pelvic support member has first and second lateral support portions operable to provide support to the pelvic area, each lateral support portion spaced from a central axis of the seat back.

19 Claims, 18 Drawing Sheets

PELVIC AND LUMBAR SUPPORT SYSTEM

BACKGROUND

The present invention relates to support systems integrated with seats, such as vehicle seats, and more particularly to lumbar support systems.

Lumbar support systems are known for use in vehicle seats. Numerous mechanical designs for providing adjustable lumbar support have been used.

SUMMARY

Current lumbar supports provide only limited support to the pelvic area. Often, as lumbar support is increased, the pelvic area tends to rotate rearwardly, increasing the tendency for discomfort and lower back pain. This phenomenon is especially evident in lumbar support designs that allow the lumbar apex curve to shift upward as an allowance for different L3 positions of the lumbar vertebrae.

While some attempts have been made to provide support low in the seat, such systems have not provided the desired amount, comfort level, or location of the support. The present invention provides an improved pelvic and lumbar support system that provides a user-adjustable, upwardly and forwardly-directed arching support or force designed to comfortably and effectively reduce or eliminate the rearward rotation of the pelvis. The ability to move or keep the pelvis forward can help reposition the pelvis and spinal column into a more preferred biomechanical geometry. The pelvic support is applied laterally of the sacrum/coccyx, thereby avoiding uncomfortable, direct and centrally-concentrated pressure on the sacrum or coccyx.

In one embodiment, the invention provides a pelvic support apparatus for a seat having a seat back and a seat pan. The pelvic support apparatus includes a frame positioned within the seat back and a pelvic support member coupled with the frame adjacent a bottom of the seat back and a rear of the seat pan. The pelvic support member is movable between a first, retracted position, and a second, extended position that provides support to a pelvic area of a person seated in the seat. The pelvic support member has first and second lateral support portions operable to provide support to the pelvic area, each lateral support portion spaced from a central axis of the seat back.

In another embodiment, the invention provides a combined lumbar and pelvic support apparatus for a seat having a seat back and a seat pan. The support apparatus includes a frame positioned within the seat back, a lumbar support member coupled with the frame and movable between a first, retracted position, and a second, extended position that provides support to a lumber area of a person seated in the seat, and a pelvic support member coupled with the frame adjacent a bottom of the seat back and a rear of the seat pan. The pelvic support member is movable between a first, retracted position, and a second, extended position that provides support to a pelvic area of the person seated in the seat. The pelvic support member has first and second lateral support portions operable to provide support to the pelvic area, each lateral support portion spaced from a central axis of the seat back.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
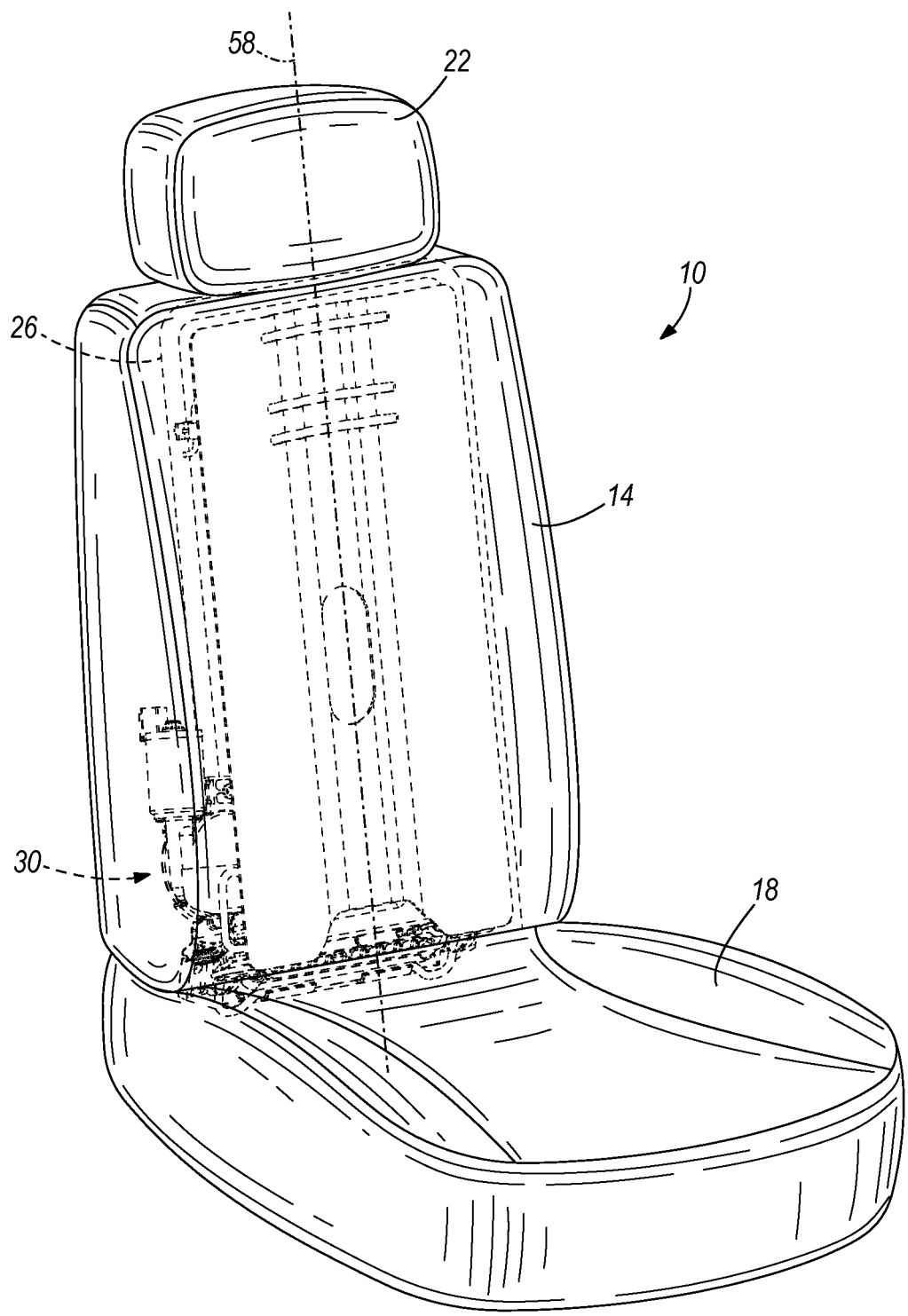
FIG. 1 is a front perspective view of a seat including a pelvic and lumbar support system embodying the invention.

FIG. 1 illustrates a seat 10 having a seat back 14, a seat pan 18, and a head rest 22. The illustrated seat is of the type commonly found in vehicles (e.g., cars, trucks, vans, etc.), however, the present invention can be practiced in any type of seat, including chairs (e.g., office chairs, recliners, etc.). A seat frame 26 is positioned in at least the seat back 14 to provide a rigid, structural support to the seat 10. A combined lumbar and pelvic support apparatus 30 is coupled to the frame 26 within the seat 10, as shown in hidden lines in FIG. 1.

Figure 2:
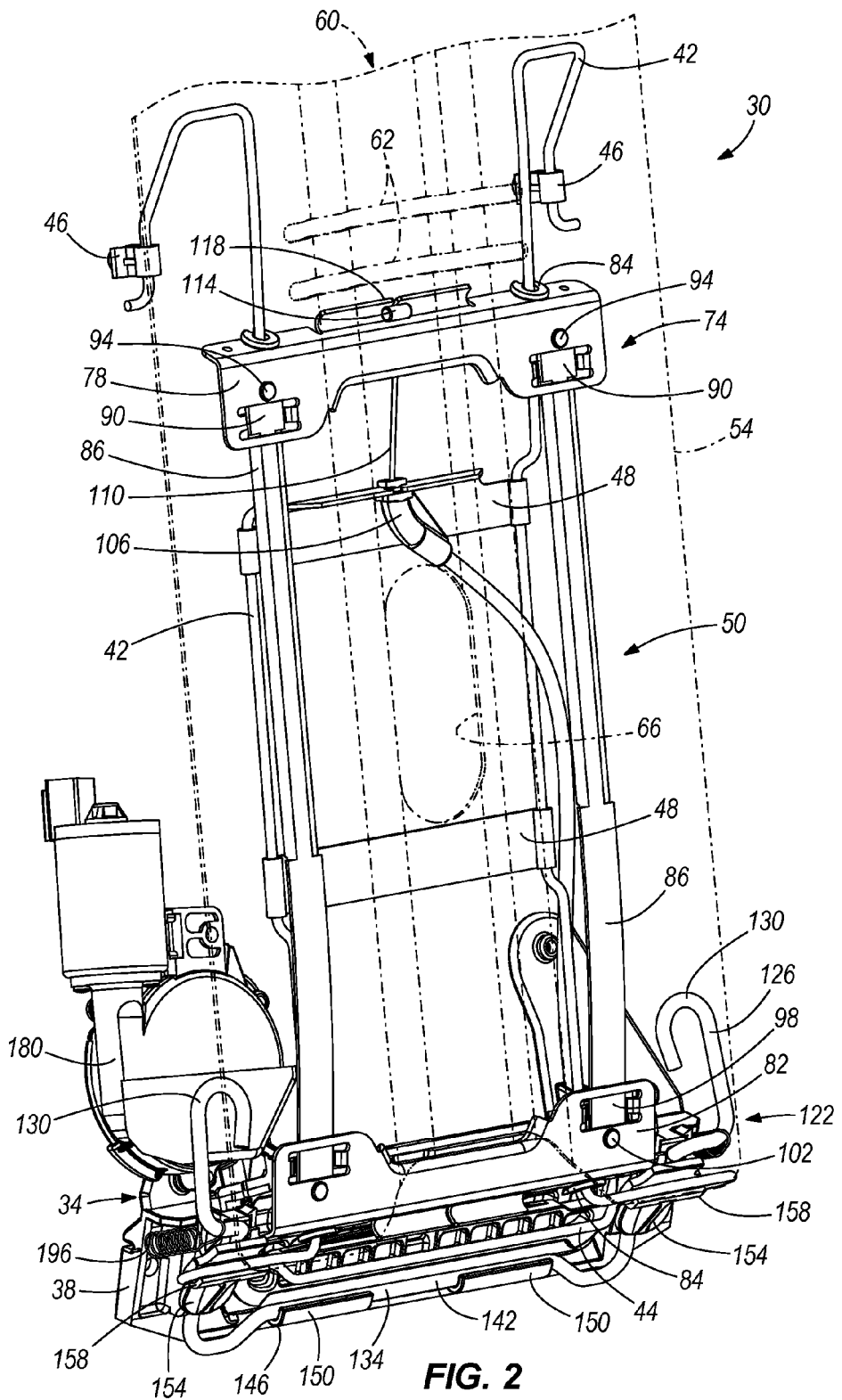
FIG. 2 is a front perspective view of the pelvic and lumbar support system of FIG. 1.
Figure 2A:
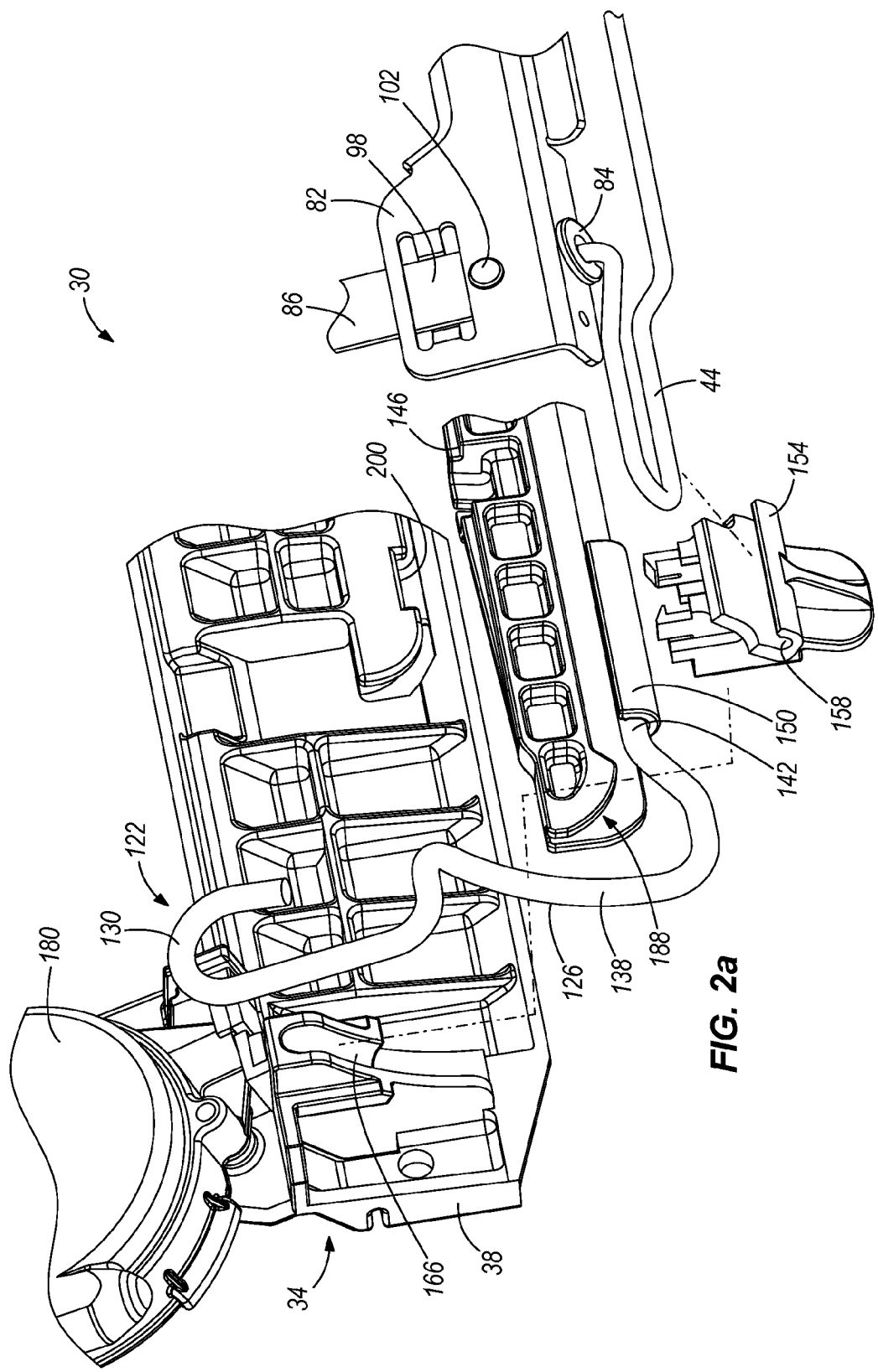
FIG. 2a is a partial exploded view of a lower portion of the pelvic and lumbar support system of FIG. 1.
Figure 3:
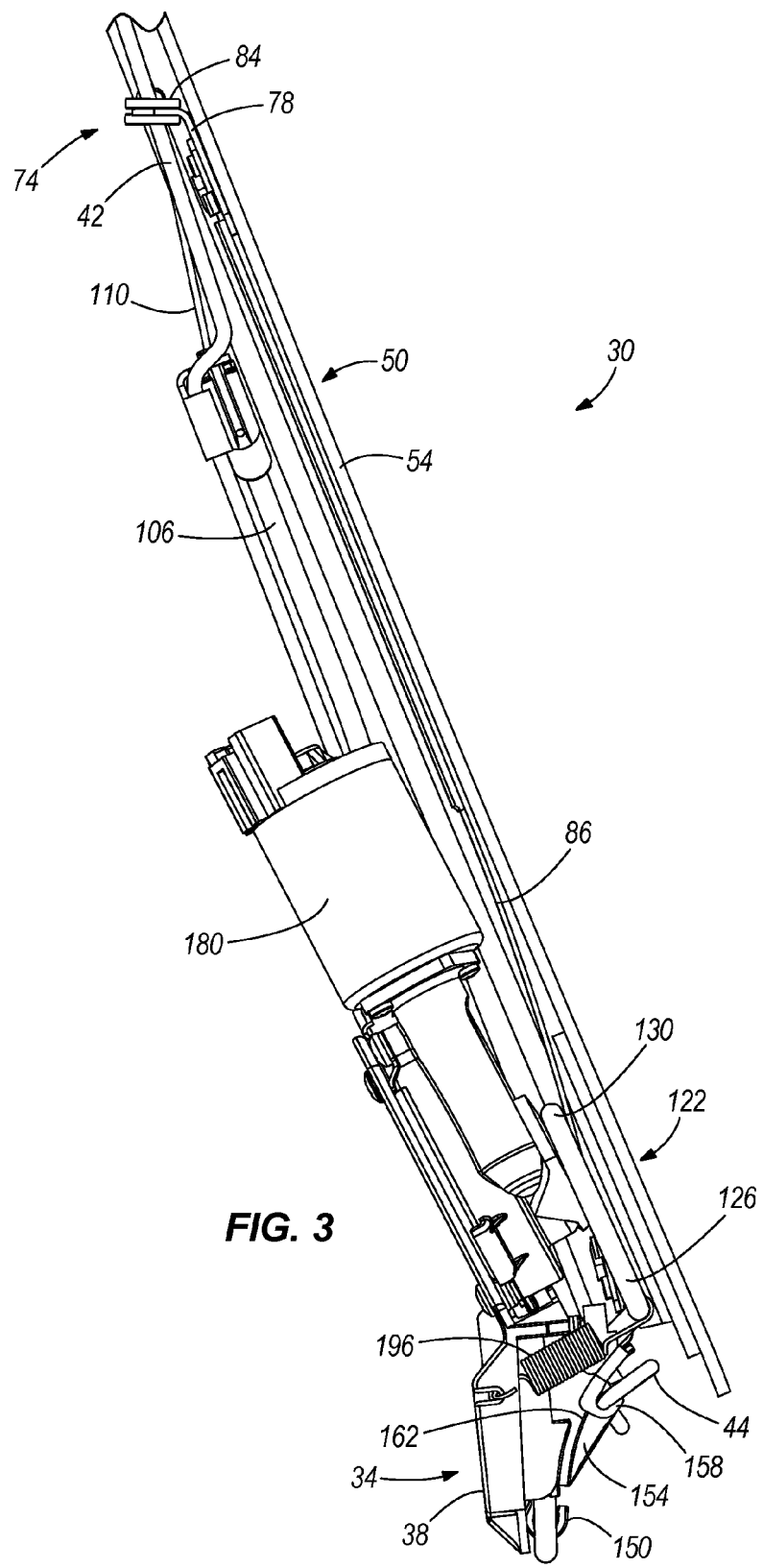
FIG. 3 is a side view of the pelvic and lumbar support system of FIG. 1 shown in a first, retracted position.
Figure 4:
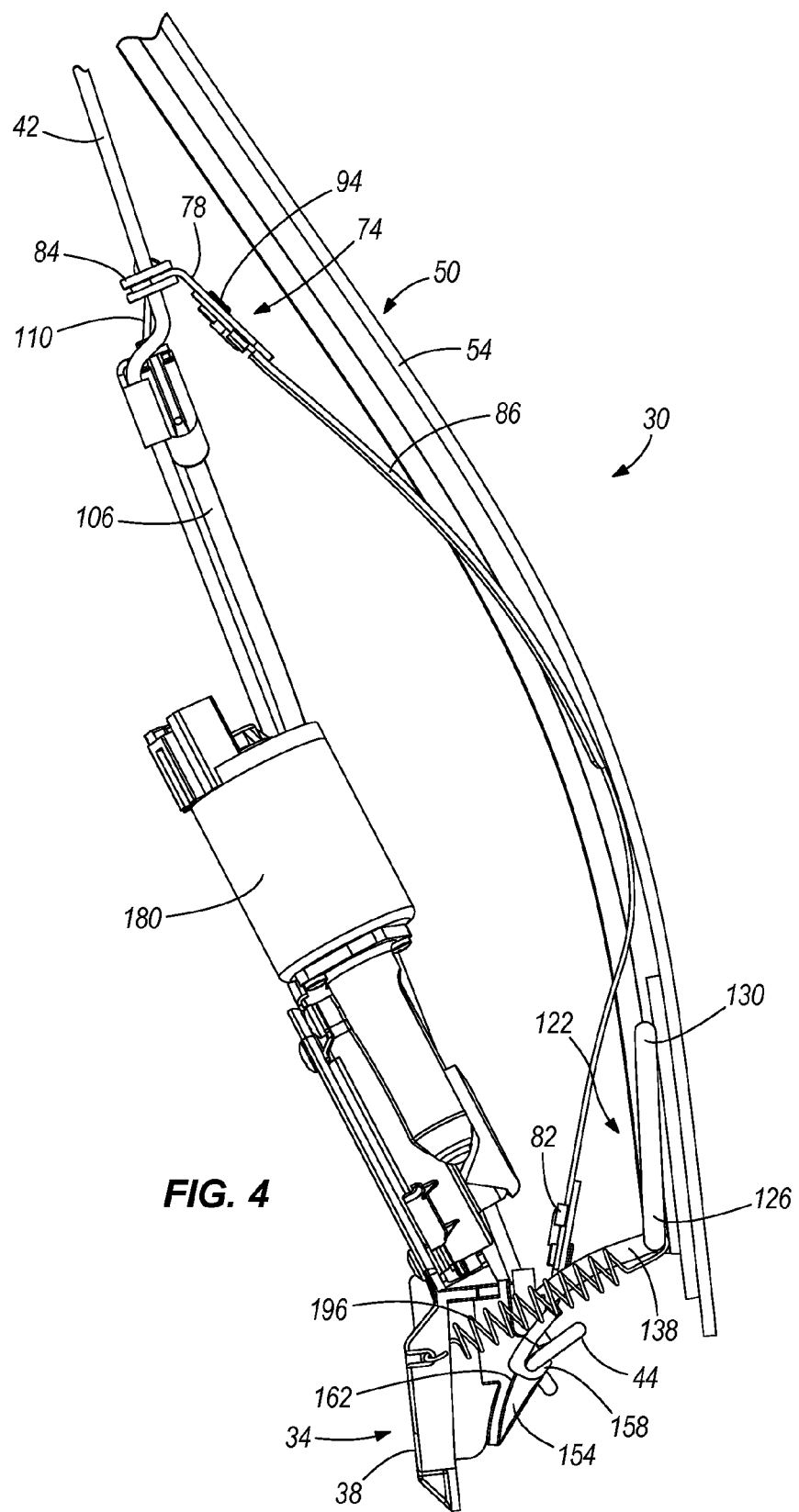
FIG. 4 is a side view of the pelvic and lumbar support system of FIG. 1 shown in a second, extended support position.
Figure 5:
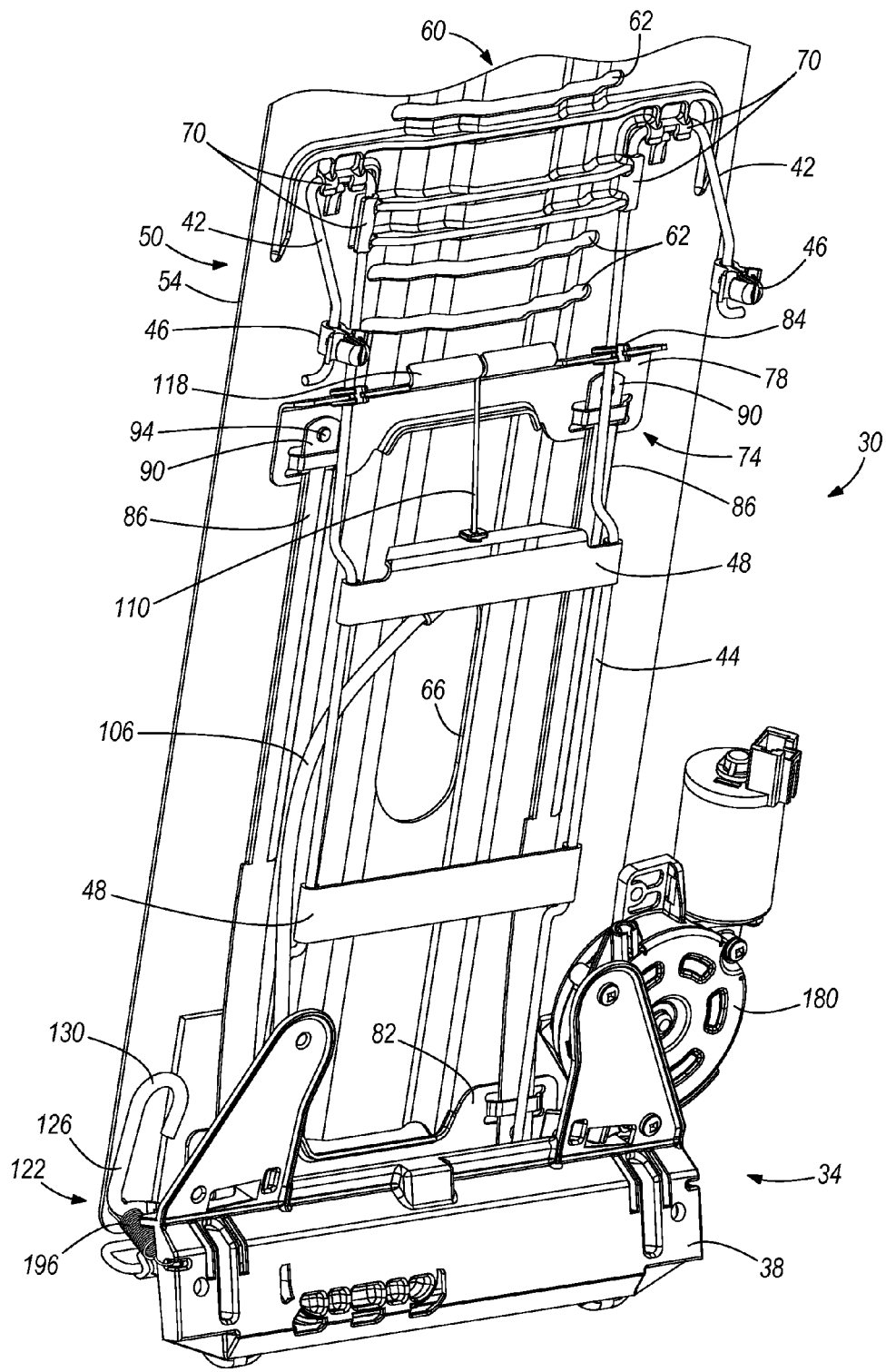
FIG. 5 is a rear perspective view of the pelvic and lumbar support system of FIG. 1.

FIGS. 2-10 illustrate a first embodiment of the combined lumbar and pelvic support apparatus 30 of the invention. The combined lumbar and pelvic support apparatus 30 includes a frame 34 that supports the various components and that is coupled to the seat frame 26 at one or more locations to support the apparatus 30 within the seat 10. The frame 34 includes a base portion 38 adjacent a bottom of the seat back 14 and a rear of the seat pan 18, and a pair of rod members 42 extending upwardly from the base portion 38. In the illustrated embodiment, the pair of rod members 42 are actually the two ends of a single formed rod member 44. Each of the base portion 38 and the rod members 42 are coupled to the seat frame 26 using any suitable technique. For example, as shown in FIGS. 2 and 5, fasteners 46 are provided to couple the upper ends of the rod members 42 to the seat frame 26. The base portion 38 can also be coupled to the seat frame 26 using fasteners, (e.g., conventional or otherwise), welding, or other suitable techniques. A pair of cross-members 48 extend laterally between the rod members 42 to support the rod members 42 relative to one another. Fewer or more cross-members can also be used.

The apparatus 30 further includes a lumbar support assembly 50 having a lumbar support member or basket 54 formed of a generally flexible material (e.g., plastic). The illustrated lumbar support basket 54 takes the form of a generally planar, flexible sheet centered relative to a longitudinal or central axis 58 (see FIG. 1) of the seat 10. The lumbar support basket 54 is positioned within the seat back 14 and is capable of being adjusted relative to the seat back 14 to provide the desired lumbar support to a person seated in the seat 10.

As best shown in FIG. 5, the illustrated lumbar support member 54 is contoured in the middle portion 60 along its vertical length to more comfortably receive the spine of a person seated in the seat 10 (see also FIG. 6) and to reduce direct application of force to the spinal vertebrae. The contouring of the basket 54 in the direction normal to the central axis 58 can be varied as desired, both at the contoured middle portion 60 and at the lateral edges. For example, the lateral edges of the basket could be upturned toward the front to provide additional lateral support in the seat 10. The basket 54 can also include slots or grooves 62 sized and configured to facilitate deflection and comfort contouring of the basket 54. The number, size, and location of the slots 62 can be varied as desired. For example, slots 62 can be formed along the outer periphery of the basket 54 to decrease firmness on the outer edges of the basket 54. Additionally, the basket 54 material and thickness can be varied (overall or locally) to alter the stiffness and deflection properties. An aperture 66 can also be formed in the basket 54 to facilitate the passage of air therethrough from an optional fan or blower 70 (see FIGS. 11-14) for seats having a heating and/or cooling option. The basket 54 can be coupled to the rod members 42 of the frame 34 at the top end of the basket 54, as shown in FIG. 5. Rod receiving members 70 on the basket 54 receive portions of the rod members 42. The rod receiving members 70 can be integrally formed with the basket 54, or can be separate members attached to the basket 54. Of course, other methods of securing the basket 54 to the frame 34 can also be used.

The lumbar support assembly 50 further includes a sub-frame or driving assembly 74 operable to deform or deflect the basket 54 to provide different amounts of lumbar support. The driving assembly 74 includes upper and lower support members 78, 82, respectively, that support two spaced-apart, flexible actuation bands 86. The upper support member 78 is slidably supported on the rod members 42 of the frame 34, with the rod members 42 passing through respective portions of the upper support member 78 as shown in FIGS. 2 and 5. Upper ends 90 of the actuation bands 86 are secured to the upper support member 78 by respective fasteners 94 (e.g., rivets). Lower ends 98 of the actuation bands 86 are secured to the lower support member 82 by respective fasteners 102 (e.g., rivets). The lower support member 82 is supported directly or indirectly by the frame 34, and in the illustrated embodiment receives the rod members 42 therethrough. Each of the upper and lower support members 78 and 82 are loosely coupled to the rod members 42 via eyelets 84 so that the upper and lower members 78 and 82 can rock or tilt on the rod members 42 as the actuation bands 86 flex.

The driving assembly 74 is operable to cause the deflection of the basket 54 between a first, retracted position (see FIG. 3) and a second, extended position (see FIG. 4) to provide differing amounts of support to the lumbar region of the user of the seat 10. Movement of the basket 54 to the extended position is achieved by moving (i.e., sliding) the upper support member 78 downwardly along the rod members 42 toward the lower support member 82. Due to the fixed length of the actuation bands 86, and their fixed mountings to the support members 78, 82, downward movement of the upper support member 78 causes the actuation bands 86 to bow outwardly, toward the rear surface of the basket 54, thereby causing the outward deflection of the basket 54 toward the user sitting in the seat 10, as shown in FIG. 4.

Figure 8:
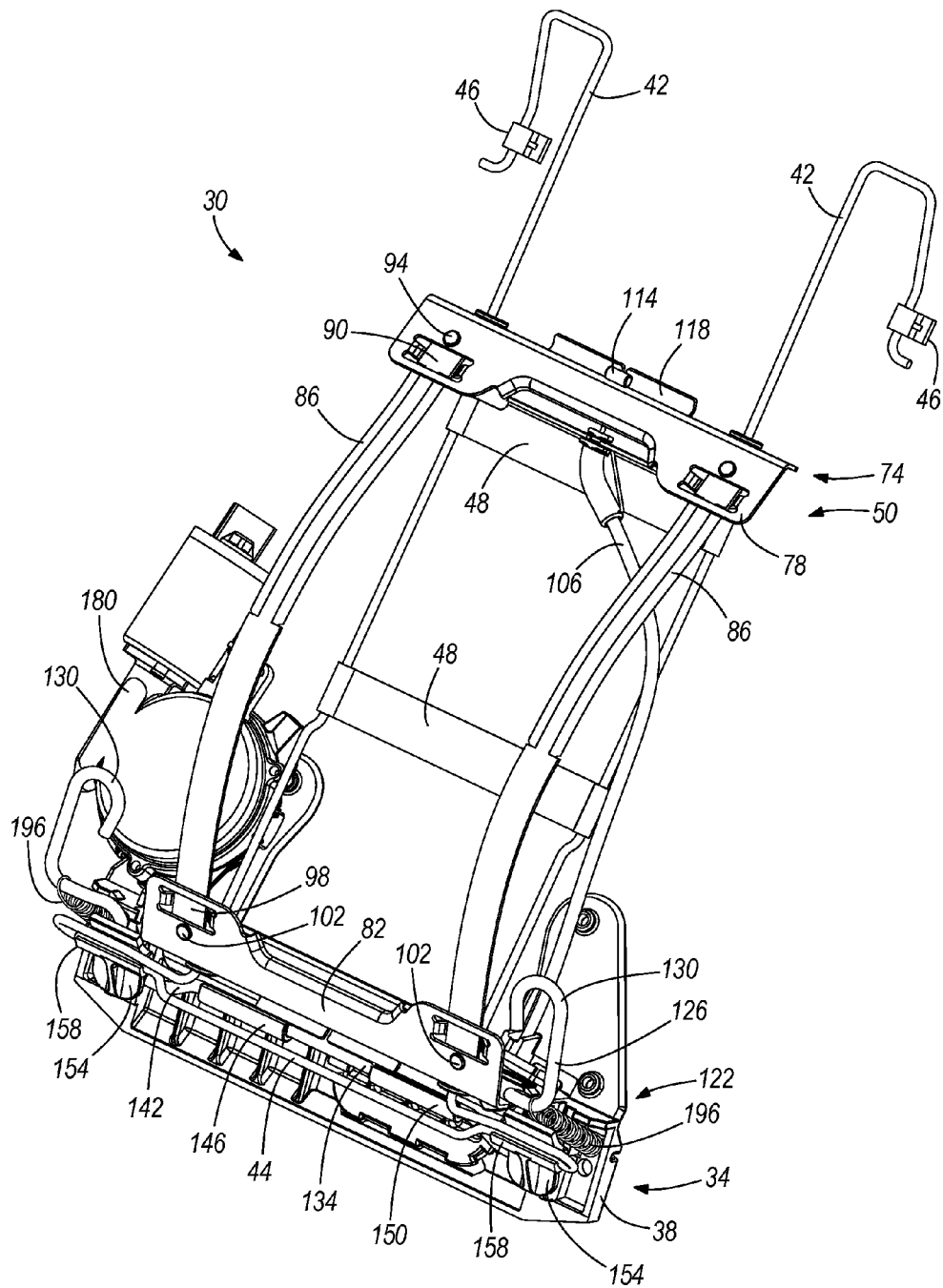
FIG. 8 is a front perspective view of the pelvic and lumbar support system of FIG. 1 shown with the lumbar support basket removed and in the second, extended support position.

Movement of the upper support member 78 is driven by an actuator cable (e.g., a Bowden cable). As best seen in FIGS. 2 and 5, an actuator cable sheath 106 is secured to the upper cross-member 48 in a conventional manner. An actuator cable 110 extends from the sheath 106 and terminates at a termination member 114 fixed to the upper support member 78. In the illustrated embodiment, the termination member 114 is a barrel-terminator held in place by a formed-up portion 118 of the upper support member 78. Of course, other configurations for securing the cable 110 to the upper support member 78 can be substituted (see FIGS. 13 and 14). Actuation of the actuator cable 110 causes movement of the cable 110 within the sheath 106, and can selectively pull the upper support member 78 downwardly as shown in FIGS. 4 and 8, or allow the upper support member 78 to return to its upper, rest position shown in FIGS. 3 and 7 under the urging of the actuation bands 86, which naturally want to return to their straight, un-bowed configurations. Further detail regarding the activation of the actuator cable 110 will be provided below.

While not shown, it is also understood that the lumbar support assembly 50 can include additional functionality to adjust the lumbar support vertically within the seat back 14 to accommodate different users. For example, the entire driving assembly 74 could be vertically movable along the rod members 42 so that the vertex of the bowed actuation bands 86 could be adjusted vertically within the seat back 14 as desired. Additionally, other lumbar support assemblies can be substituted for the illustrated assembly 50 without deviating from the invention (see e.g., FIGS. 15 and 16).

The combined lumbar and pelvic support apparatus 30 further includes a pelvic support apparatus or assembly 122 having a pelvic support member 126 operable to provide support to a pelvic area of a person seated in the seat 10. The pelvic support member 126 is designed to comfortably and effectively reduce or eliminate the rearward rotation of the pelvis as lumbar support is increased. The ability to move or keep the pelvis forward can help reposition the pelvis and spinal column into a more preferred biomechanical geometry. As will be further described below, the pelvic support is applied laterally of the sacrum/coccyx, thereby avoiding and preventing uncomfortable, direct and centrally-concentrated pressure on the sacrum or coccyx.

The illustrated pelvic support member 126 is positioned adjacent a bottom of the seat back 14 and a rear of the seat pan 18 and has first and second lateral support portions 130 connected by an intermediate portion 134 (see FIG. 2). One lateral support portion 130 is spaced to the right of the longitudinal axis 58 and the other lateral support portion 130 is spaced to the left of the longitudinal axis 58. The illustrated pelvic support member 126 is formed from a rod having a generally constant cross-sectional shape, with the distal ends of the rod defining ends of the inverted J-shaped lateral support portions 130. However, other configurations of the pelvic support member 126 are also contemplated. For example, the rod 126 can be an injection molded, stamped, or die-cast part having either a constant or varying cross-sectional shape. Additionally, the lateral support portions 130 can vary in shape and/or material to tune the feel of the lateral support portions 130 against the pelvis (e.g., harder or softer materials, and larger, smaller, and different areas and locations of contact). The illustrated J-shaped lateral support portions can be altered to V-shaped or U-shaped (see e.g., FIGS. 13 and 14), or other shapes. Additionally, the lateral support portions 130 could take the form of paddles (i.e., solid in cross-section) of various shapes to provide more contact surface area.

Figure 6:
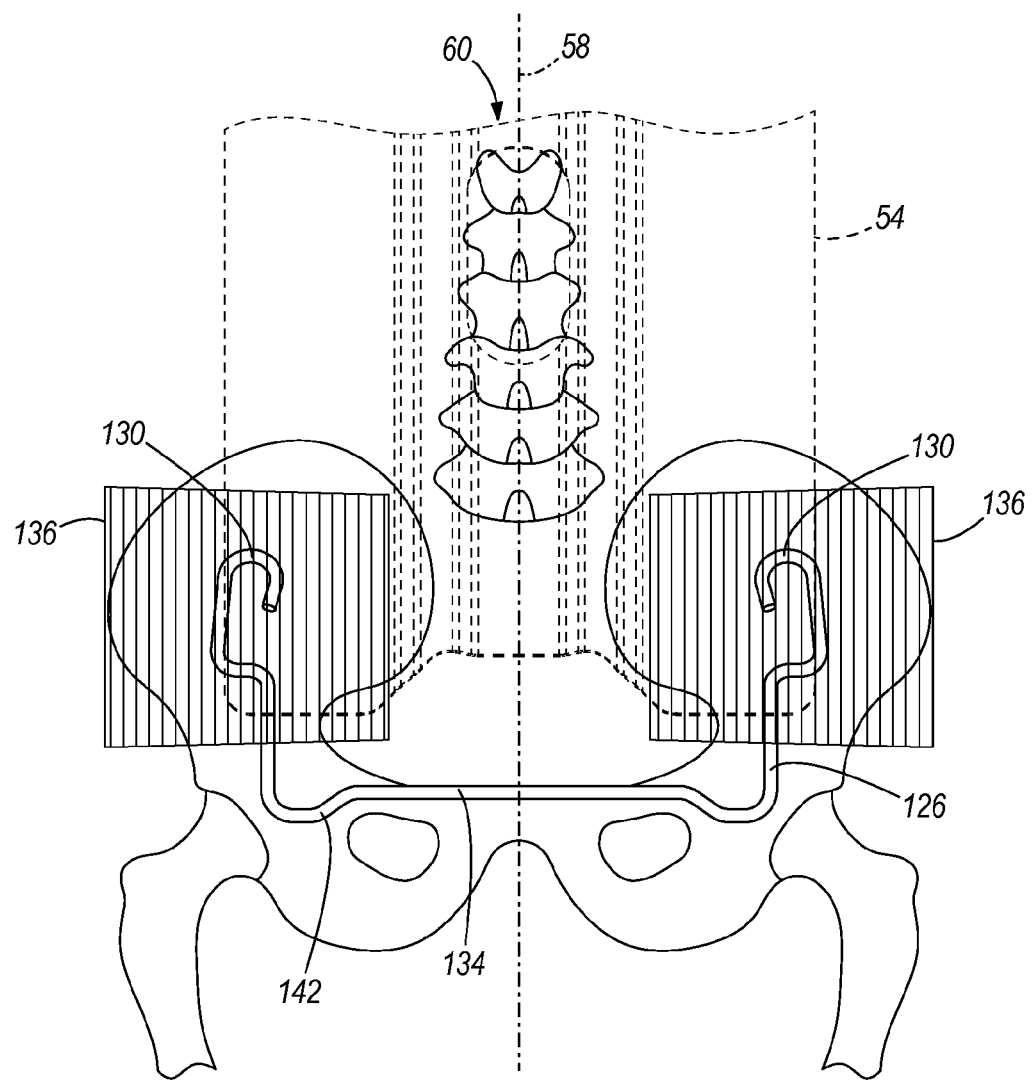
FIG. 6 is schematic view illustrating the application of support by the pelvic and lumbar support system of FIG. 1 with respect to a seated person's general lumbar, sacral, and pelvic anatomy.
Figure 7:
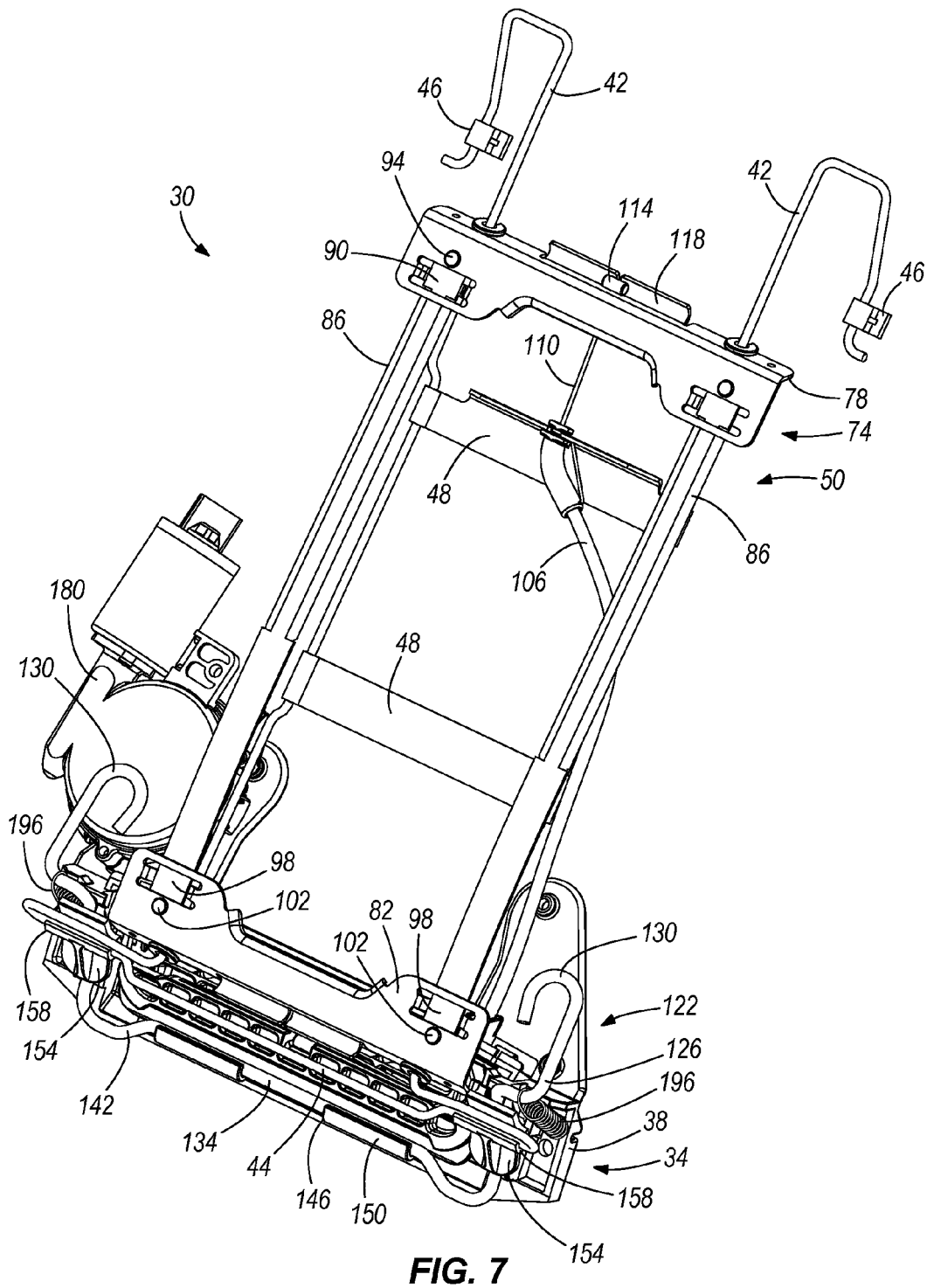
FIG. 7 is a front perspective view of the pelvic and lumbar support system of FIG. 1 shown with the lumbar support basket removed and in the first, retracted position.

As best shown in FIGS. 3, 4, 9, and 10, the lateral support portions 130 are positioned behind the basket 54 and are movable as part of the pelvic support member 126 between a first, retracted position (see FIGS. 3 and 9) and a second, extended position (see FIGS. 4 and 10) that provides support to the user's pelvic region laterally of the sacrum/coccyx. FIG. 6 schematically illustrates how the direct support to the pelvic region created by the lateral support portions 130 at zones 136 is provided laterally of (i.e., spaced from) the longitudinal axis 58 and spaced from the sacrum/coccyx. This configuration eliminates uncomfortable pressure from being applied centrally to the user's sacrum/coccyx, and instead applies pressure near the pelvic crests and surrounding soft tissue.

Figure 10:
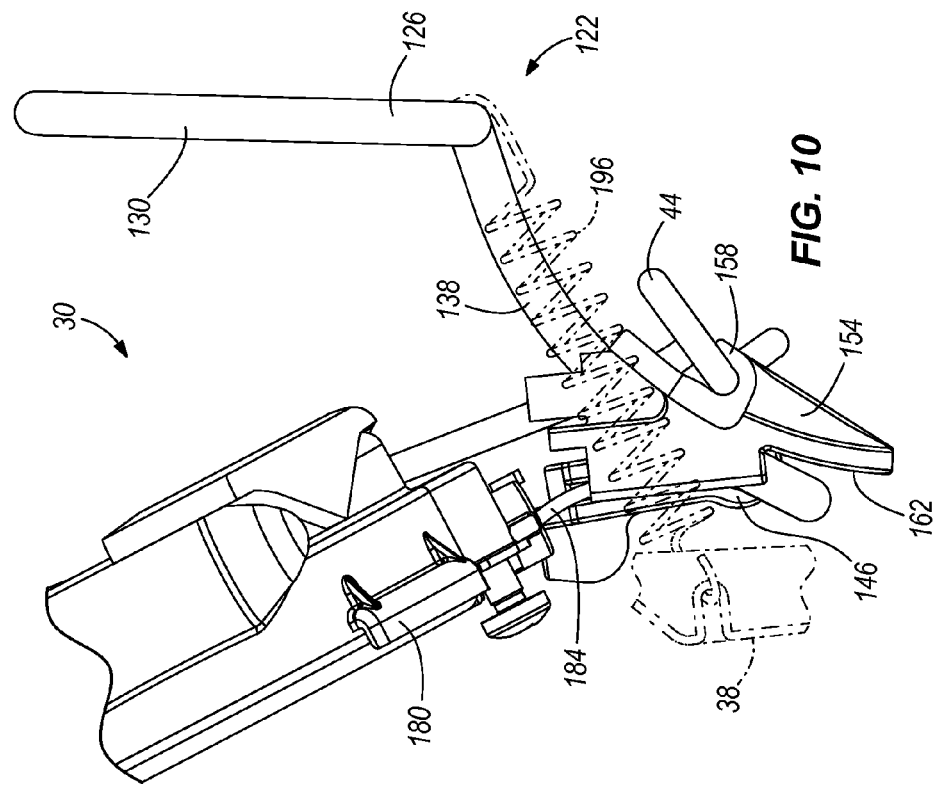
FIG. 10 is an enlarged partial side view, with some parts removed for clarity, of the pelvic support member in the second, extended support position.
Figure 9:
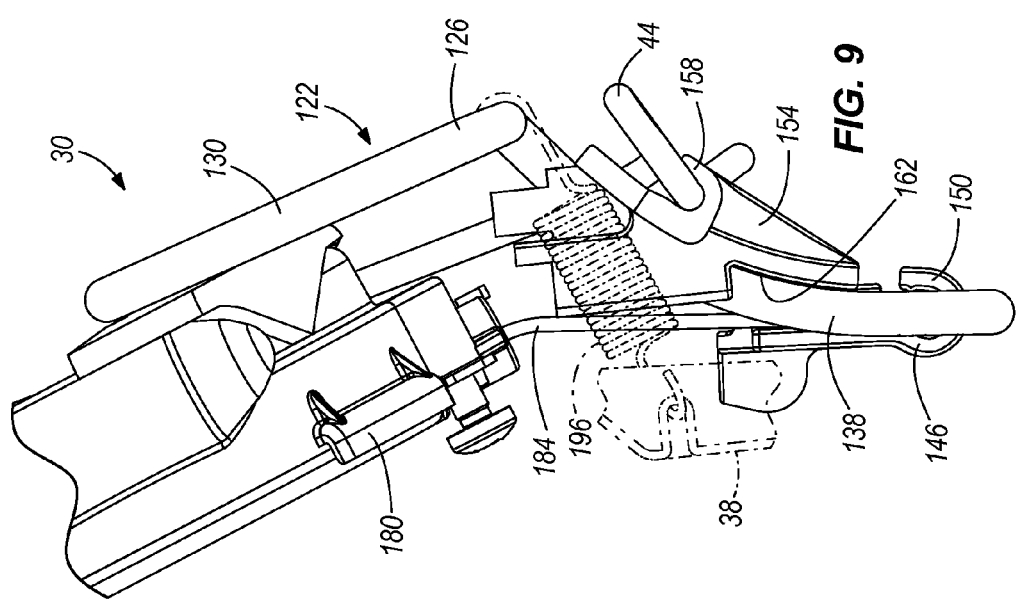
FIG. 9 is an enlarged partial side view, with some parts removed for clarity, of the pelvic support member in the first, retracted position.
Figure 9A:
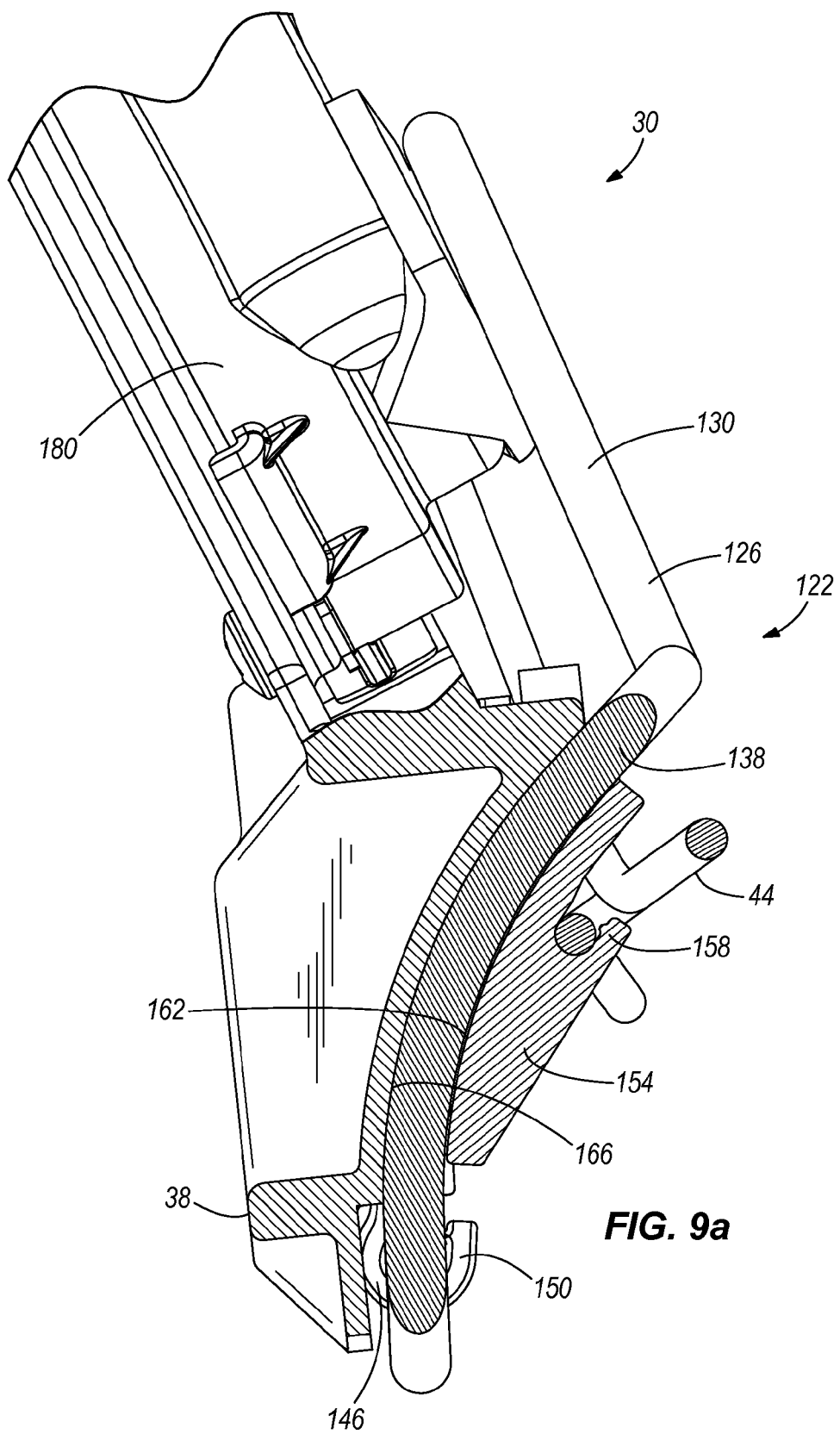
FIG. 9a is a section view illustrating the supporting structure of the pelvic support member.

Referring to 2a, 3, 4, 9, 9a, and 10, the intermediate portion 134 of the pelvic support member 126 includes arcuate portions 138 (only one is shown in FIGS. 2a, 3, 4, 9, 9a, and 10) that extend from the lateral support portions 130 in a direction downwardly and rearwardly relative to the seat back 14. As best shown in FIGS. 9, 9a, and 10, the arcuate portions 138 have a concave curvature when viewed from the bottom. The arcuate portions 138 transition into a generally straight, transversely-extending connection portion 142 (see FIGS. 2 and 2a) of the intermediate portion 134 that extends between the arcuate portions 138.

The support structure for the pelvic support member 126 will now be described with respect to FIGS. 2a, 9, 9a, and 10. The intermediate portion 134, and more specifically the connection portion 142 of the pelvic support member 126 is supported by a movable support member 146 movably coupled to the base portion 38 of the frame 34. The movable support member 146 includes one or more cradle portions 150 that receive and pivotably support the connection portion 142. A pair of guide members 154 are coupled with the base portion 38 and are further supported by receiving respective laterally-extending portions of the rod member 44. Each guide member 154 includes a cradle portion 158 that receives the rod member 44. Therefore, the guide members 154 are generally stationary relative to the seat 10. The guide members 154 include an arcuate guide surface 162 that generally corresponds in curvature to the curvature of the arcuate portions 138 of the pelvic support member 126. In other words, the convex upward curvature of the arcuate guide surface 162 receives and generally conforms to the concave bottom surface of the arcuate portions 138. The guide members 154 are positioned forward of the arcuate portions 138 in a direction toward the user seated in the seat 10. The arcuate portions 138 are also supported on their rearward side by arcuate guide surfaces 166 (see FIGS. 2a and 9a—only one is shown) formed in the base portion 38 of the frame 34, such that the arcuate portions 138 are slidably sandwiched between the base portion 38 and the guide members 154.

Movement of the pelvic support member 126 between the retracted (see FIG. 9) and the extended (see FIG. 10) positions is controlled by an actuator 180 mounted to the body portion 38 of the frame 34 and operable by the user to control the positions of the lumbar support member 54 and the pelvic support member 126. In the embodiment illustrated in FIGS. 1-10, the single actuator 180 controls movement of both of the lumbar support member 54 and the pelvic support member 126 synchronously such that the lumbar support member 54 and the pelvic support member 126 move together and are not capable of independent operation.

Figure 5A:
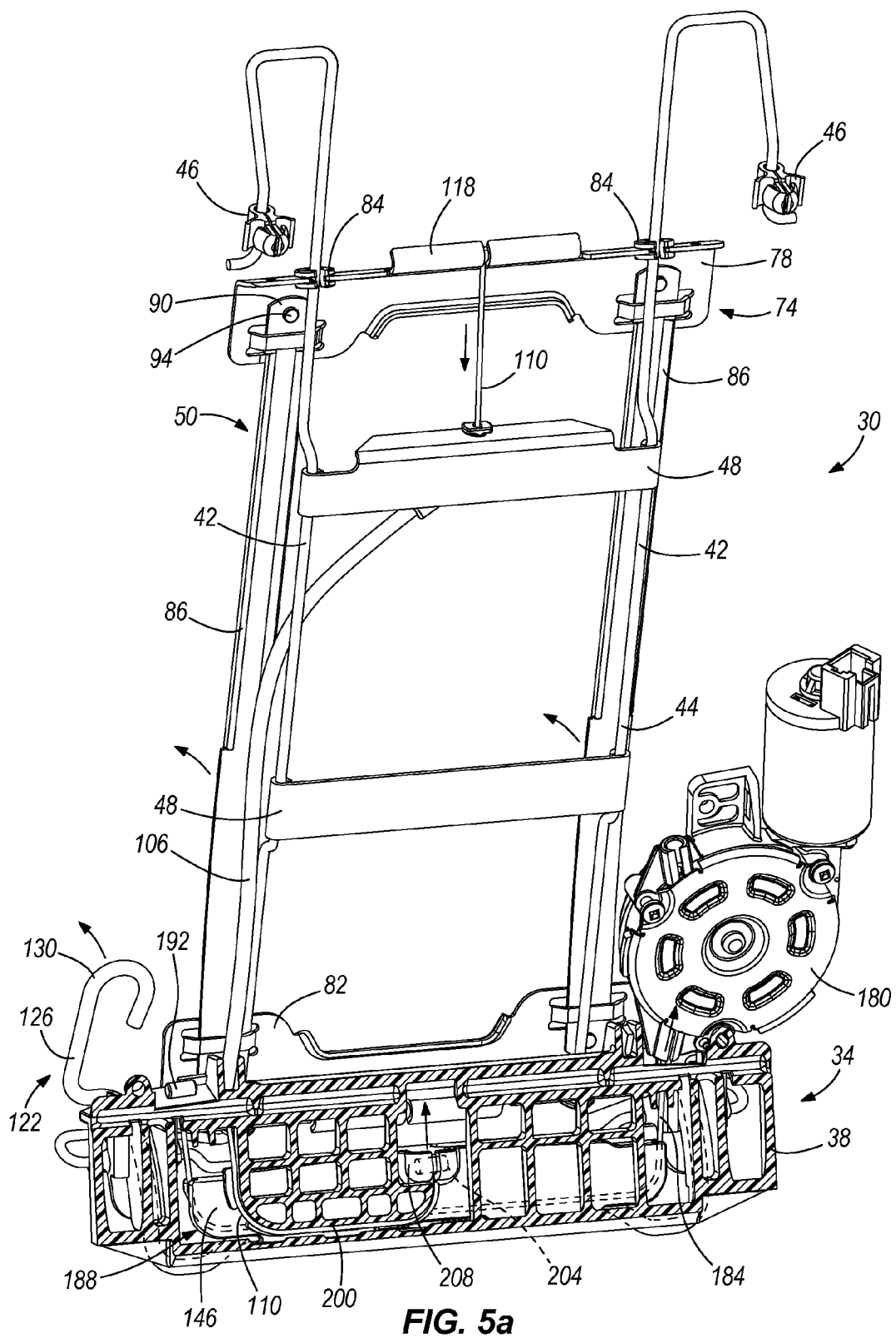
FIG. 5a is a rear perspective view of the pelvic and lumbar support system of FIG. 1 with features removed and cut away to better illustrate the actuator cables.

As best shown in FIG. 5a, an actuator cable 184 extends from the actuator 180, runs in a channel 188 formed in a lower surface of the movable support member 146, and terminates at a termination member 192 fixed to the base portion 38. In the illustrated embodiment, the termination member 192 takes the form of a barrel-terminator, however, other termination arrangements can be substituted. Actuation of the actuator 180 retracts the cable 184 into the actuator 180, thereby shortening the length of the cable 184, which in turn causes upward movement of the movable support member 146 relative to the base portion 38 (see FIGS. 9 and 10). Because the movable support member 146 supports the connection portion 142 of the pelvic support member 126, upward movement of the movable support member 146 causes upward movement of the pelvic support member 126 as well. The upward travel of the pelvic support member 126 is guided by the arcuate guide surfaces 162 of the guide members 154 and the arcuate guide surfaces 166 of the base portion 38, which slidably sandwich the arcuate portions 138 of the pelvic support member 126 to create an upward and forwardly-arching movement of the pelvic support member 126 along an arcuate path from the position shown in FIGS. 3 and 9 to the position shown in FIGS. 4 and 10. This arcuate path of movement, and the resulting force applied to the pelvis corresponds to the pelvis' natural path of rotation for a seated human. The lateral support portions 130 extend in the upward and forwardly-arching manner into engagement with the rear of the lumbar support basket 54 to comfortably provide support to the pelvic region of the user as the lumbar support basket 54 also provides added support to the user's lumbar region.

A pair of biasing members in the form of return springs 196 assist in moving the pelvic support member 126 from the extended position back to the retracted position. With reference to FIGS. 2, 3, 4, 9, and 10, one return spring 196 is coupled with each lateral support portion 130 and with the base portion 38 of the frame 34. In the illustrated embodiment, each return spring 196 is hooked at one end to the lateral support portion 130 and at the other end to the base portion 38 to bias the pelvic support member to the retracted position. As the pelvic support member is moved by actuation of the actuator 180 to the extended position, the bias of the springs 196 is overcome, causing the springs 196 to stretch as shown in FIGS. 4 and 10. Once the actuator 180 is actuated to lengthen the cable 184, the potential energy stored in the springs 196 helps to move the pelvic support member 126 back to the retracted position. It is understood, that the springs 196 are optional, as the pelvic support member 126 may be capable of retracting on its own due to the weight of the user in the seat 10. Furthermore, other return spring or biasing arrangements can be substituted for the illustrated return springs 196.

As mentioned above, the actuator 180 controls synchronous movement of both the lumbar support basket 54 and the pelvic support member 126. Recall that the sheath 106 connected to the upper cross member 48 houses the actuator cable 110 operable to move the actuation bands 86, and therefore the basket 54, between the extended and retracted positions. As best shown in FIG. 5a, the lower end of the sheath 106 is coupled to the base portion 38 of the frame 34 and the cable 110 extends from the lower end of the sheath 106 around a lower surface 200 formed by the base portion 38, and terminates at a termination end 204 fixed to the movable support member 146. In the illustrated embodiment, the termination end 204 takes the form of a barrel-terminator that is received in a pocket 208 formed in the movable support member 146, however, other termination configurations can be used. As the movable support member 146 moves upwardly due to retraction of the cable 184 by the actuator 180, the termination end 204 also moves upwardly, thereby causing the cable 110 to slide along the lower surface 200 of the stationary base portion 38 and pull the upper support member 78 downwardly to bow the actuation bands 86 and the basket 54. The length of the actuator cables 110 and 184 is established so as to provide the appropriate amount of movement of the various components of the combined pelvic and lumbar support apparatus 30 to achieve the desired synchronous movement of the lumbar support basket 54 and the pelvic support member 126.

Figure 11:
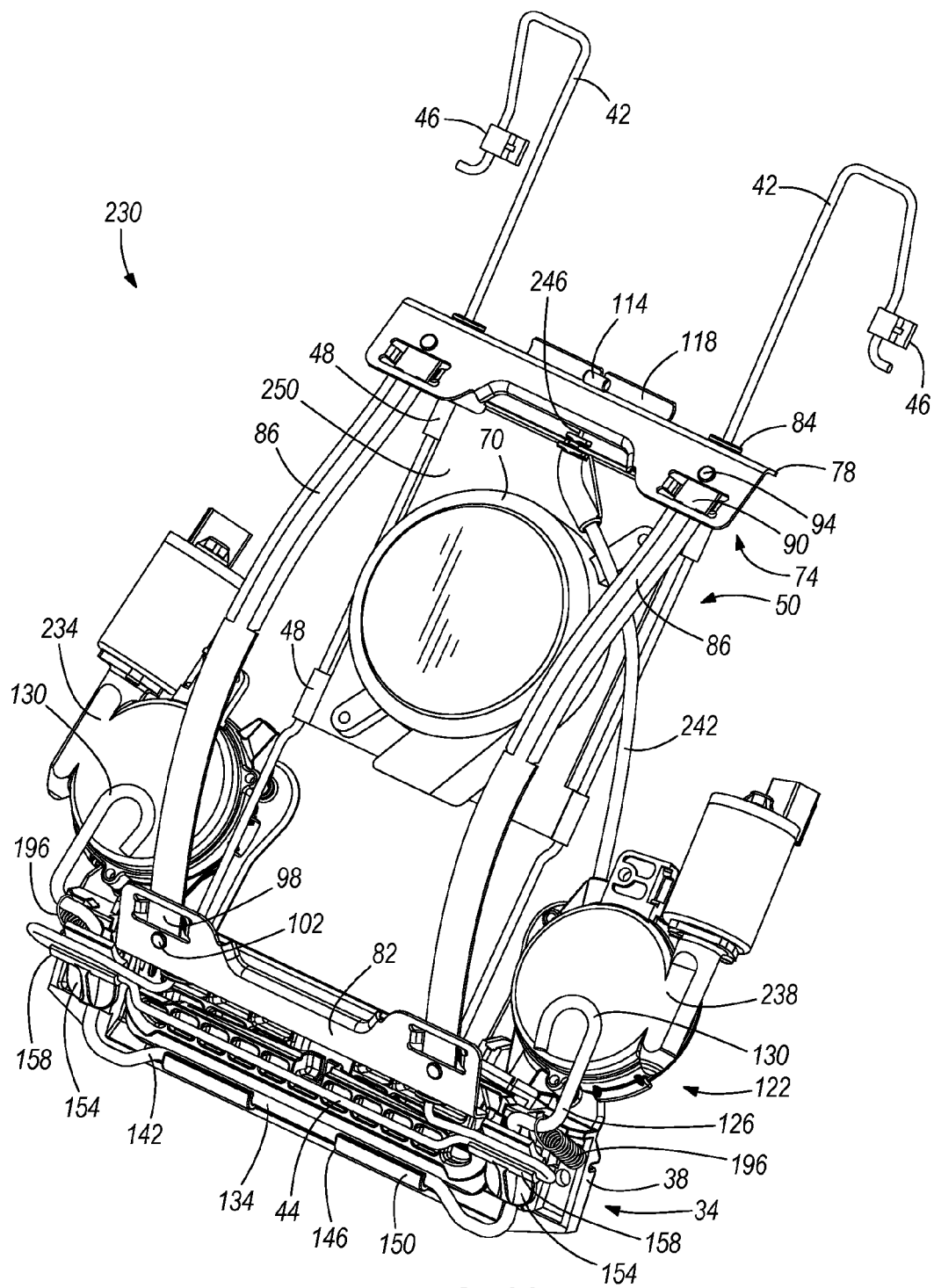
FIG. 11 is a front perspective view of a second embodiment of a pelvic and lumbar support system embodying the invention and shown with the lumbar support basket removed, the pelvic support member in the first, retracted position, and the lumbar support in the second, extended support position.
Figure 12:
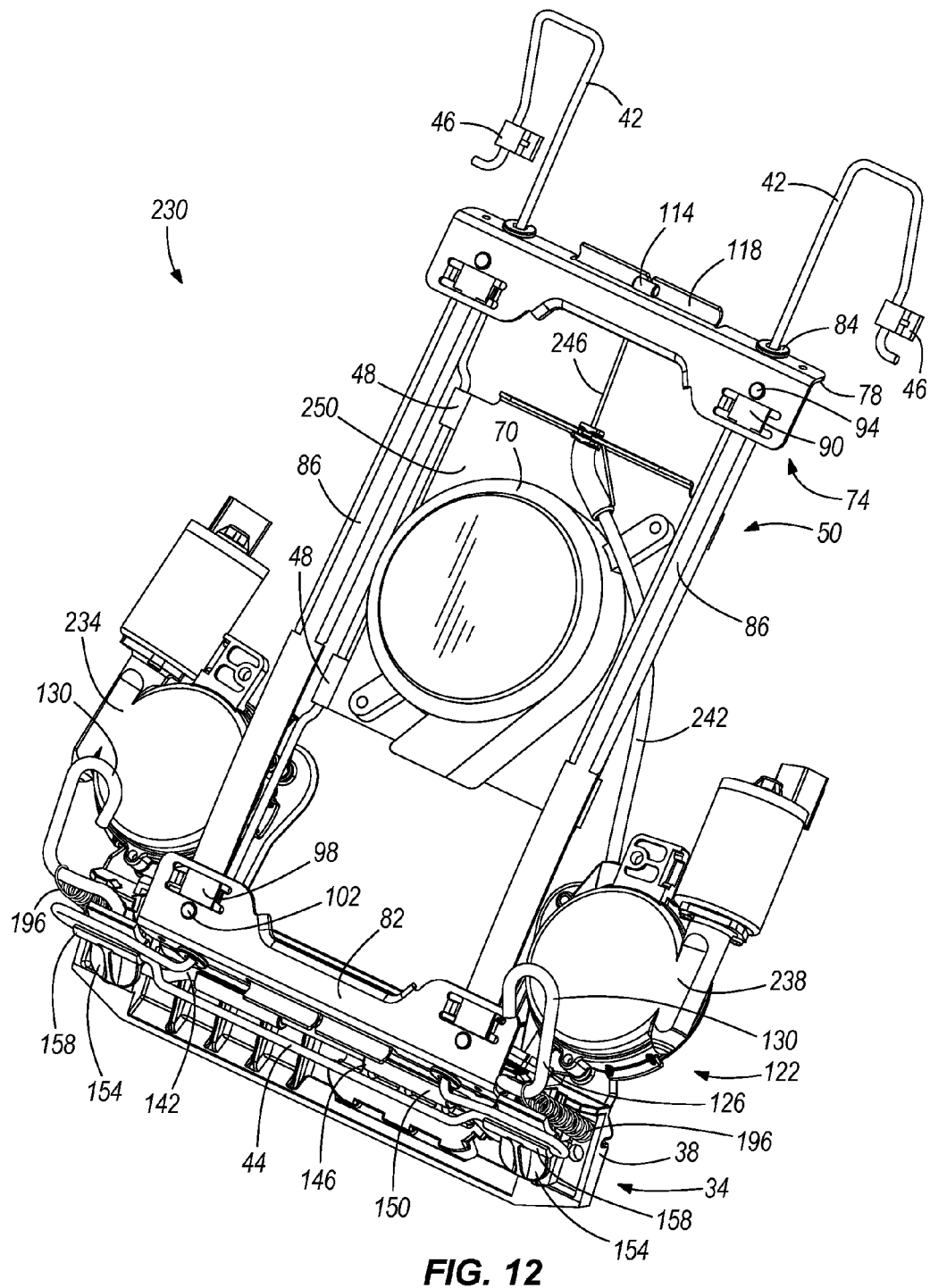
FIG. 12 is a front perspective view of the pelvic and lumbar support system of FIG. 11 shown with the lumbar support basket removed, the pelvic support member in the second, extended support position, and the lumbar support in the first, retracted position.

FIGS. 11 and 12 illustrate a second embodiment of a combined pelvic and lumbar support apparatus 230, shown with the basket 54 removed for clarity. The apparatus 230 is similar to the apparatus 30 in many respects and like parts have been given like reference numbers. One difference is that the apparatus 230 includes two actuators instead of one to provide independent operability to the lumbar support basket 54 and the pelvic support member 126. Actuator 234 is operable by the user to adjust the position of the pelvic support member 126, in the same or a similar manner as described above with respect to the apparatus 30, between the extended position (see FIG. 12) and the retracted position (see FIG. 11). Instead of having the actuator cable 184 terminate at the termination end 192 on the base portion 38, the cable 184 can extend to and terminate at the second actuator 238.

Actuator 238 is operable by the user to adjust the position of the lumbar support basket 54. The actuator 238 is mounted on the base portion 38 on the opposite side of the apparatus 230 from the actuator 234. A sheath 242 and an actuator cable 246 extend from the actuator 238 and are coupled with the upper cross-member 48 (and/or the plate 250 discussed below) and the upper support member 78 in the same manner as discussed above with respect to the apparatus 30. The actuator 238 is operable to retract and extend the actuator cable 246 to move the upper support member 78, and therefore the actuation bands 86 and basket 54 between the extended position (see FIG. 11) and the retracted position (see FIG. 12).

The independent operability of the apparatus 230 is illustrated in FIGS. 11 and 12 by showing how the actuation bands 86 can be in the extended position while the pelvic support member 126 is in the retracted position (see FIG. 11), and how the actuation bands 86 can be in the retracted position while the pelvic support member 126 is in the extended position (see FIG. 12). Of course, the user can select the desired independent positioning combination of the basket 54 and the pelvic support member 126 to achieve the most comfortable support. While not shown, it is also understood that the lumbar support assembly 50 can include additional functionality to adjust the lumbar support vertically within the seat back 14 to accommodate different users. For example, the entire driving assembly 74 could be vertically movable along the rod members 42 so that the vertex of the bowed actuation bands 86 could be adjusted vertically within the seat back 14 as desired. Additionally, other lumbar support assemblies can be substituted for the illustrated assembly 50 without deviating from the invention (see e.g., FIGS. 15 and 16).

The apparatus 230 also includes the optional fan/blower 70 for the heated and or cooled seat option. The blower 70 is shown mounted on a plate 250 supported between or integrally-formed with the cross-members 48, but can also be coupled with the apparatus 230 in alternative manners. Air from the blower 70 can be directed through the aperture 66 (see FIG. 5) in the basket 54 to allow the air to flow through the basket to the front of the seat back 14.

Figure 13:
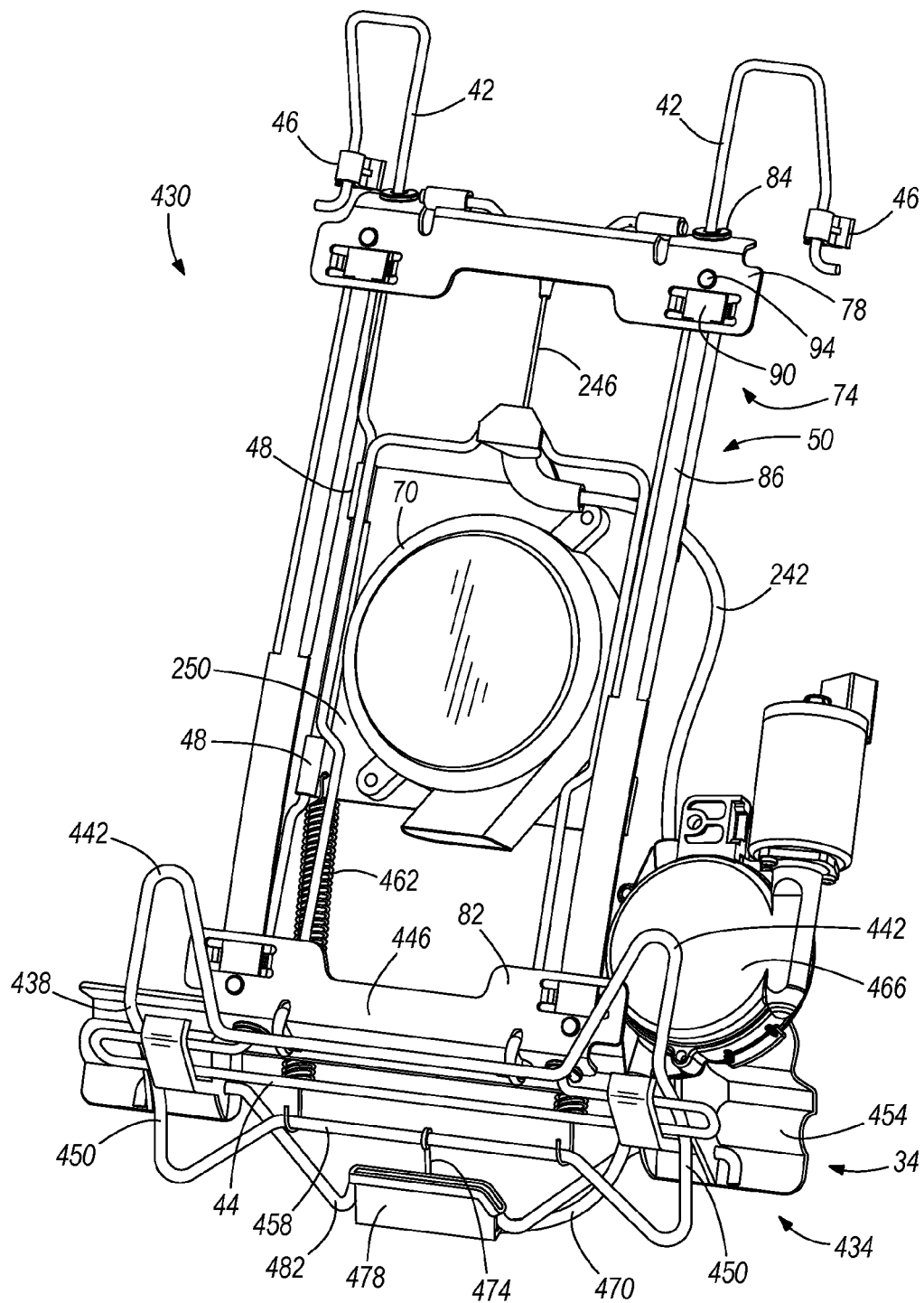
FIG. 13 is front perspective view of a third embodiment of a pelvic and lumbar support system embodying the invention and shown with the lumbar support basket removed and in the first, retracted position.
Figure 14:
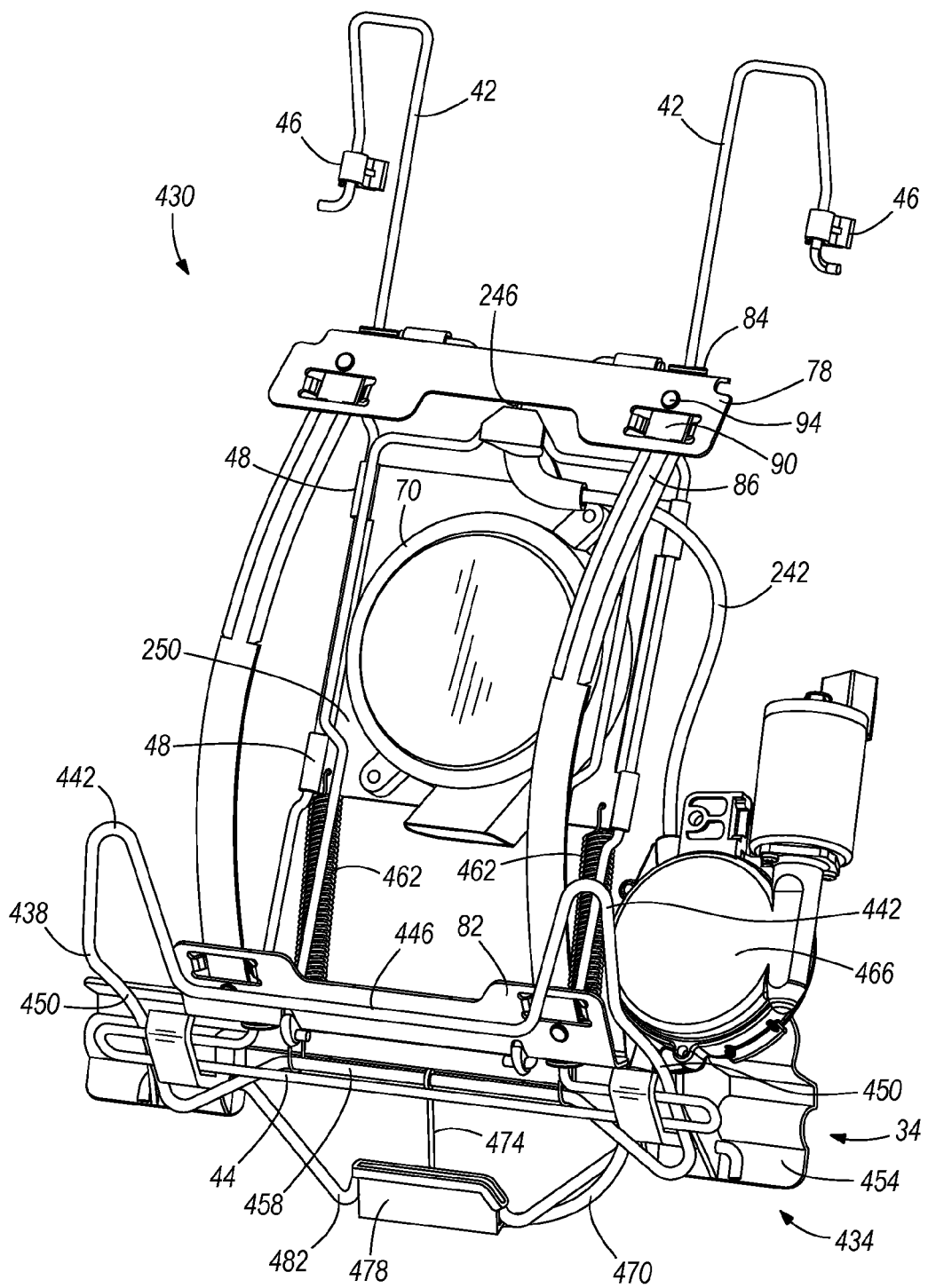
FIG. 14 is a front perspective view of the pelvic and lumbar support system of FIG. 13 shown with the lumbar support basket removed and in the second, extended support position.

FIGS. 13 and 14 illustrate a third embodiment of a combined pelvic and lumbar support apparatus 430, shown with the basket 54 removed for clarity. While like parts have been given like reference numbers, this embodiment illustrates an alternative pelvic support apparatus 434. The pelvic support member 438 takes a different form from the pelvic support member 126 shown and described above, but is still formed from a rod having a generally constant cross-sectional shape. Specifically, the lateral support portions 442 have a generally inverted V-shape or U-shape configuration, with an upper intermediate portion 446 interconnecting the two lateral support portions 442 as shown so that there are no distal ends of the pelvic support member 438. Arcuate portions 450 are similar to the arcuate portions 138 described above, and are supported on their rear side by the base portion 454. A lower intermediate portion 458 interconnects the arcuate portions 450.

Unlike the biasing arrangement of the pelvic support member 126 described above, the pelvic support member 438 is biased by biasing members or springs 462 to the extended position shown in FIG. 14. An upper end of each spring 462 is secured (e.g., hooked) to the lower cross-member 48 and/or plate 250, while a lower end of each spring 462 is secured (e.g., hooked) to the lower intermediate portion 458 of the pelvic support member 438. The springs 462 are tension springs stretched to bias the pelvic support member 438 upwardly and to the extended position as shown in FIG. 14.

To move the pelvic support member 438 to the retracted position, the user actuates an actuator 466. A sheath 470 containing an actuator cable 474 extends from the actuator 466 and is connected to a frame support 478 supported by a lower support rod 482 extending from the base portion 454. The cable 474 connects to the lower intermediate portion 458 of the pelvic support member 438 such that when the cable 474 is retracted by the actuator 466, the lower intermediate portion 458 is pulled downwardly toward the frame support 478 to the position shown in FIG. 13, overcoming the bias of the springs 462. Upon this downward movement, the arcuate portions 450 are guided by arcuate surfaces (not shown but similar to surfaces 166) of the base portion 454 along an arcuate path causing the lateral support portions 442 to be moved to the retracted position shown in FIG. 13. To extend the pelvic support member 438, the user actuates the actuator 466 to extend the cable 474, thereby allowing the springs 462 to bias the pelvic support member 438 upwardly and along the arcuate, forwardly-arching path toward the extended position shown in FIG. 14.

The single actuator 466 of this embodiment also synchronously controls the lumbar support apparatus 50 via the sheath 242 and cable 246 like that described above with respect to the apparatus 230, but with a slightly different coupling arrangement at the upper support member 78. Specifically, actuation of the actuator 466 simultaneously retracts the cable 246 and extends the cable 474 to move both the lumbar support member 54 and the pelvic support member 438 to the extended positions shown in FIG. 14. The reverse actuation of the actuator 466 by the user extends the cable 246 and retracts the cable 474 to allow both the lumbar support member 54 and the pelvic support member 438 to return to the retracted positions shown in FIG. 13. In some embodiments, the cables 474 and 246 may be a single cable. In yet other embodiments utilizing the pelvic support apparatus 434, two actuators may be used to provide independent control of the lumbar support member 54 and the pelvic support member 438.

Figure 15:
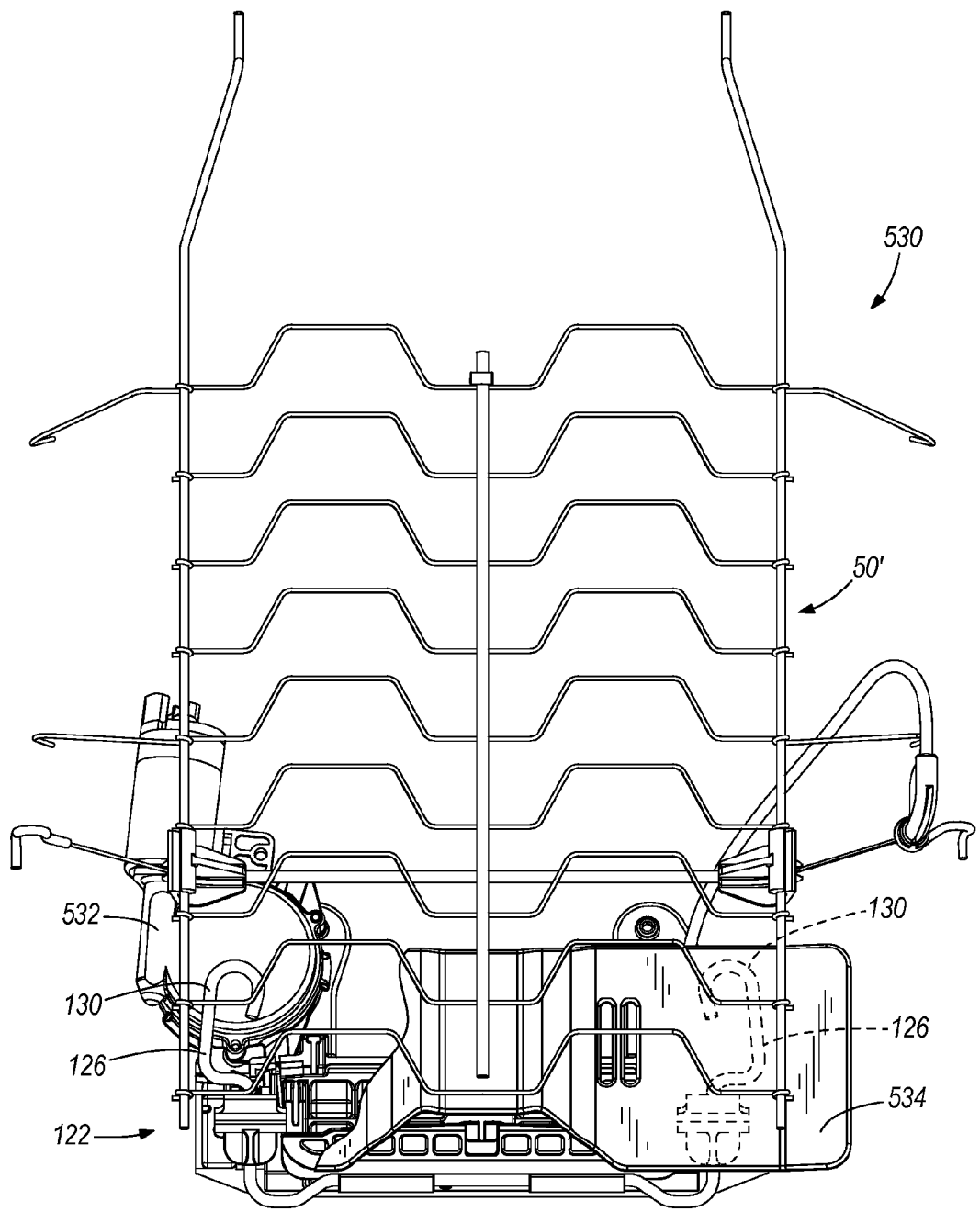
FIG. 15 is a front view of a fourth embodiment of a pelvic and lumbar support system embodying the invention.

As previously discussed above, the pelvic support assembly 122 can be used with other lumber support apparatus designs. For example, FIG. 15 illustrates a fourth embodiment of a combined pelvic and lumbar support apparatus 530 in which a different lumbar support assembly 50' is used in place of the lumbar support assembly 50 of the prior embodiments. The illustrated lumbar support assembly 50' is similar to that shown and described in U.S. Pat. No. 6,905,170, which is hereby incorporated herein by reference, and will not be described in further detail. The lumbar support apparatus 50' is used in combination with the same pelvic support assembly 122 described above. The pelvic support assembly 122 operates in the same manner discussed above as driven by the actuator 532 in synchronized relation with the lumbar support apparatus 50'. In other embodiments, two actuators can be included to provide independent actuation of the lumbar support assembly 50' and the pelvic support assembly 122.

Since the lumbar support assembly 50' does not include a basket like the basket 54, a flexible sheet 534 (shown partially broken away on the left side of FIG. 15) is included with the combined pelvic and lumbar support apparatus 530 and is positioned in front of the pelvic support member 126 such that the lateral support portions 130 can engage the rear of the flexible sheet 534 to provide a more comfortable and distributed pressure to the pelvic region of the person seated in the seat 10. The shape, material, and thickness of the flexible sheet 534 can vary in the same manner discussed above with respect to the basket 54 to provide the desired support and comfort. The flexible sheet 534 can be secured to the combined pelvic and lumbar support apparatus 530 in any suitable manner.

Figure 16:
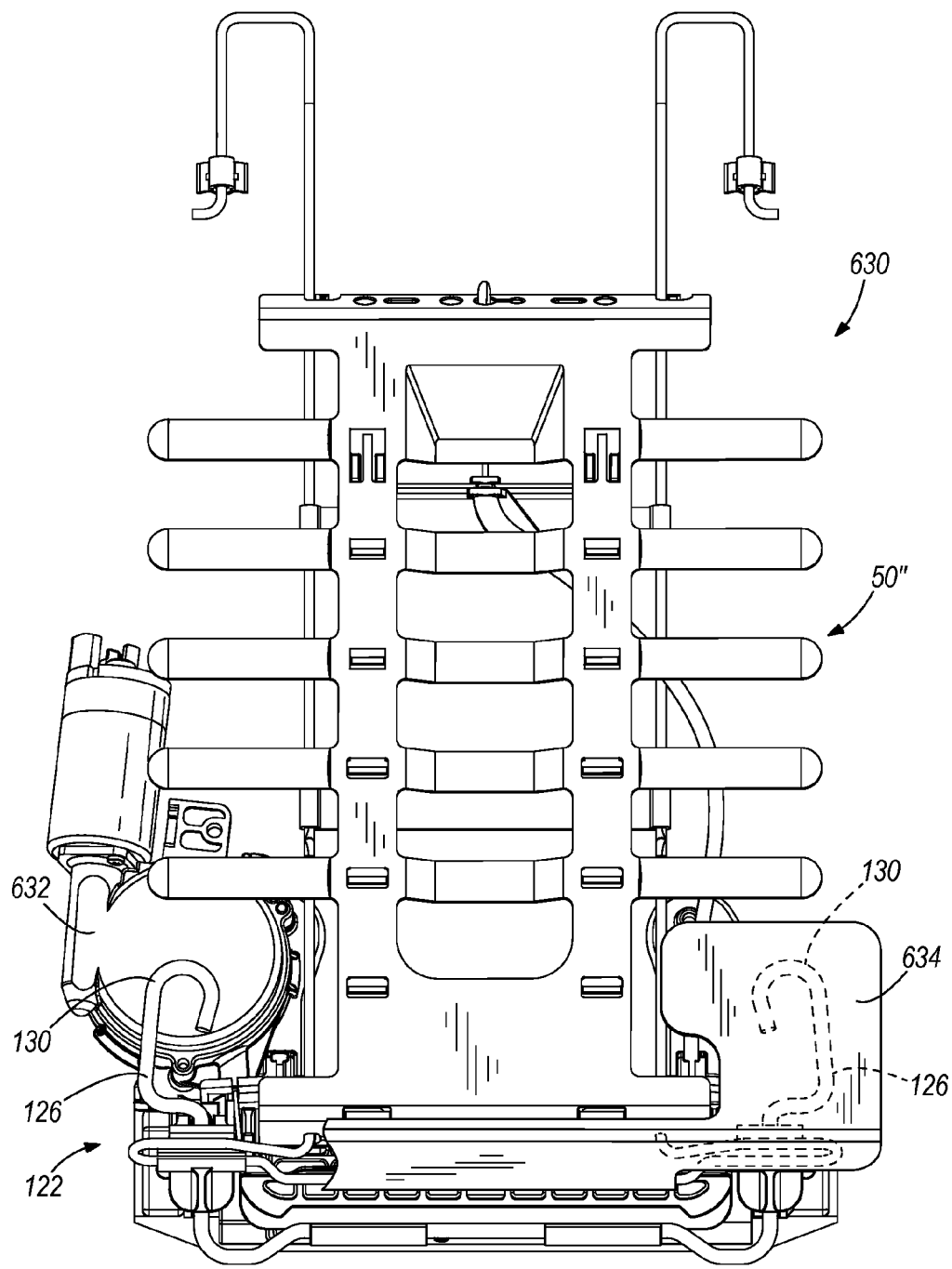
FIG. 16 is a front view of a fifth embodiment of a pelvic and lumbar support system embodying the invention.

FIG. 16 illustrates a fifth embodiment of a combined pelvic and lumbar support apparatus 630 in which yet another lumbar support assembly 50" is used in place of the lumbar support assembly 50 of the prior embodiments. The illustrated lumbar support assembly 50" is similar to that shown and described in U.S. Pat. No. 6,676,214, which is hereby incorporated herein by reference, and will not be described in further detail. The lumbar support apparatus 50" is used in combination with the same pelvic support assembly 122 described above. The pelvic support assembly 122 operates in the same manner discussed above as driven by the actuator 632 in synchronized relation with the lumbar support apparatus 50". In other embodiments, two actuators can be included to provide independent actuation of the lumbar support assembly 50" and the pelvic support assembly 122.

Since the lumbar support assembly 50" does not include a basket like the basket 54, a flexible sheet 634 (shown partially broken away on the left side of FIG. 16) is included with the combined pelvic and lumbar support apparatus 630 and is positioned in front of the pelvic support member 126 such that the lateral support portions 130 can engage the rear of the flexible sheet 634 to provide a more comfortable and distributed pressure to the pelvic region of the person seated in the seat 10. The shape, material, and thickness of the flexible sheet 634 can vary in the same manner discussed above with respect to the basket 54 to provide the desired support and comfort (compare for example with the flexible sheet 534 of FIG. 15). The flexible sheet 634 can be secured to the combined pelvic and lumbar support apparatus 630 in any suitable manner.

Various features and advantages of the invention are set forth in the following claims.

What is claimed is:

1. A pelvic support apparatus for a seat having a seat back and a seat pan, the pelvic support apparatus comprising:
   a frame positioned within the seat back;
   a pelvic support member coupled with the frame adjacent a bottom of the seat back and a rear of the seat pan, the pelvic support member movable between a first, retracted position, and a second, extended position that provides support to a pelvic area of a person seated in the seat from behind the pelvic area, the pelvic support member having first and second lateral support portions operable to provide support to the pelvic area, each lateral support portion spaced from a central axis of the seat back; and
   a guide member coupled with the frame and the pelvic support member to guide movement of the pelvic support member relative to the frame, the guide member including an arcuate surface engaging an arcuate portion of the pelvic support member such that the pelvic support member is movable along an arcuate path between the first and second positions;
   wherein the pelvic support member does not include any portion aligned with the central axis and that provides support to the pelvic area, thereby preventing direct pressure from being applied to the person's sacrum or coccyx.

2. The pelvic support apparatus of claim 1, wherein the pelvic support member is formed from a rod having a generally constant cross-sectional shape.

3. The pelvic support apparatus of claim 1, wherein the lateral support portions are substantially J-shaped.

4. The pelvic support apparatus of claim 1, further comprising a lumbar support member coupled to the frame in the seat back, movable between a first, retracted position, and a second, extended position that provides support to the person's lumbar area, and operable with the pelvic support member such that the pelvic support member and the lumber support member both move from the respective first positions to the respective second positions synchronously.

5. The pelvic support apparatus of claim 4, wherein a single actuator controls the synchronous movement of both the pelvic support member and the lumbar support member.

6. The pelvic support apparatus of claim 1, wherein the movement of the pelvic support member along the arcuate path provides an upward and forwardly-arching movement of the pelvic support member relative to the pelvic area of the person seated in the seat.

7. The pelvic support apparatus of claim 1, further comprising a flexible sheet positioned adjacent the lateral support portions of the pelvic support member to distribute pressure on the pelvic area of the person seated in the seat.

8. A pelvic support apparatus for a seat having a seat back and a seat pan, the pelvic support apparatus comprising:
a frame positioned within the seat back;
a pelvic support member coupled with the frame adjacent a bottom of the seat back and a rear of the seat pan, the pelvic support member movable between a first, retracted position, and a second, extended position that provides support to a pelvic area of a person seated in the seat from behind the pelvic area, the pelvic support member having first and second lateral support portions operable to provide support to the pelvic area, each lateral support portion spaced from a central axis of the seat back;
a guide member coupled with the frame and the pelvic support member to guide movement of the pelvic support member relative to the frame, the guide member including an arcuate surface engaging an arcuate portion of the pelvic support member such that the pelvic support member is movable along an arcuate path between the first and second positions; and
an actuator and a biasing member coupled to the pelvic support member, the actuator and biasing member cooperating to permit movement of the pelvic support member between the first position and the second position.

9. The pelvic support apparatus of claim 8, wherein the actuator controls an actuator cable and the biasing member includes a spring.

10. A combined lumbar and pelvic support apparatus for a seat having a seat back and a seat pan, the support apparatus comprising:
a frame positioned within the seat back;
a lumbar support member coupled with the frame and movable between a first, retracted position, and a second, extended position that provides support to a lumbar area of a person seated in the seat;
a pelvic support member coupled with the frame adjacent a bottom of the seat back and a rear of the seat pan, the pelvic support member movable between a first, retracted position, and a second, extended position that provides support to a pelvic area of the person seated in the seat, the pelvic support member having first and second lateral support portions operable to provide support to the pelvic area, each lateral support portion spaced from a central axis of the seat back; and
a guide member coupled with the frame and the pelvic support member to guide movement of the pelvic support member relative to the frame, the guide member including an arcuate surface engaging an arcuate portion of the pelvic support member such that the pelvic support member is movable along an arcuate path between the first and second positions.

11. The combined lumbar and pelvic support apparatus of claim 10, wherein the lumbar support member and the pelvic support member are synchronously operable to move together between the respective first and second positions.

12. The combined lumbar and pelvic support apparatus of claim 11, wherein a single actuator controls the synchronous movement of both the pelvic support member and the lumbar support member.

13. The combined lumbar and pelvic support apparatus of claim 10, wherein the lumbar support member and the pelvic support member are independently operable to move between the respective first and second positions.

14. The combined lumbar and pelvic support apparatus of claim 13, wherein a first actuator controls the movement of the pelvic support member and a second actuator controls the movement of the lumbar support member.

15. The combined lumbar and pelvic support apparatus of claim 10, wherein the pelvic support member does not include any portion aligned with the central axis and that provides support to the pelvic area, thereby preventing direct pressure from being applied to the person's sacrum or coccyx.

16. The combined lumbar and pelvic support apparatus of claim 10, wherein the pelvic support member is formed from a rod having a generally constant cross-sectional shape.

17. The combined lumbar and pelvic support apparatus of claim 10, wherein the lateral support portions are substantially J-shaped.

18. The combined lumbar and pelvic support apparatus of claim 10, wherein the movement of the pelvic support member along the arcuate path provides an upward and forwardly-arching movement of the pelvic support member relative to the pelvic area of the person seated in the seat.

19. The combined lumbar and pelvic support apparatus of claim 10, further comprising a flexible sheet positioned adjacent the lateral support portions of the pelvic support member to distribute pressure on the pelvic area of the person seated in the seat.

* * * * *